(12) United States Patent
Su

(10) Patent No.: US 11,872,096 B2
(45) Date of Patent: Jan. 16, 2024

(54) FIXING STRUCTURE OF DENTAL HANDPIECE

(71) Applicant: TTBIO CORP., Taichung (TW)

(72) Inventor: Gene Su, Taichung (TW)

(73) Assignee: TTBIO CORP., Taichung (TW)

( * ) Notice: Subject to any disclaimer, the term of this patent is extended or adjusted under 35 U.S.C. 154(b) by 283 days.

(21) Appl. No.: 17/201,421

(22) Filed: Mar. 15, 2021

(65) Prior Publication Data

US 2022/0287799 A1 Sep. 15, 2022

(51) Int. Cl.
*A61C 1/14* (2006.01)

(52) U.S. Cl.
CPC .............. *A61C 1/141* (2013.01); *A61C 1/145* (2013.01)

(58) Field of Classification Search
CPC ........................................................ A61C 1/141
USPC ............................................................ 433/126
See application file for complete search history.

(56) References Cited

U.S. PATENT DOCUMENTS

| | | | | |
|---|---|---|---|---|
| 4,104,799 A * | 8/1978 | Leonard | ................... | A61C 1/14 433/129 |
| 4,382,790 A * | 5/1983 | Loge | ....................... | A61C 1/18 433/126 |
| 5,055,044 A * | 10/1991 | Kuhn | ....................... | A61C 1/14 433/126 |
| 6,398,551 B1 * | 6/2002 | Schatz | ..................... | A61C 1/08 433/126 |
| 8,459,992 B2 * | 6/2013 | Carron | ................... | A61C 1/185 433/125 |
| 2003/0190582 A1 * | 10/2003 | Lou | .......................... | A61C 1/08 433/133 |
| 2004/0014000 A1 * | 1/2004 | Bernhard | ................. | A61C 1/18 433/82 |
| 2008/0318185 A1 * | 12/2008 | Mizunuma | .............. | A61C 1/12 433/132 |

FOREIGN PATENT DOCUMENTS

EP 2387967 B1 12/2012

* cited by examiner

*Primary Examiner* — Heidi M Eide
(74) *Attorney, Agent, or Firm* — MUNCY, GEISSLER, OLDS & LOWE, PC

(57) ABSTRACT

A fixing structure of a dental handpiece has a transmission assembly for connecting a handpiece head, a positioning sleeve sleeved onto the transmission assembly and having a positioning member thereon, and a casing composed of a front casing and a rear casing. The front casing is sleeved onto the positioning sleeve. The rear casing is detachably connected to one end of the front casing. The front casing is provided with a push member. The push member is inserted inwardly to lean against the positioning member for the positioning member to be tightly pressed against an outer circumferential surface of the transmission assembly so that the front casing, the positioning sleeve and the transmission assembly are fixed and connected together.

2 Claims, 8 Drawing Sheets

FIXING STRUCTURE OF DENTAL HANDPIECE

FIELD OF THE INVENTION

The present invention relates to an assembly structure of a dental handpiece, and more particularly to a fixing structure of a dental handpiece.

BACKGROUND OF THE INVENTION

In order to facilitate the holding and operation of a conventional dental handpiece, the casing of the dental handpiece is usually designed in the form of an integral curved rod. However, because the transmission mechanism mounted in the casing and configured to drive the handpiece head to actuate is compact, it will be quite troublesome and difficult when the transmission mechanism is to be mounted inside the casing in the form of a curved rod. If the casing is composed of a curved casing and a straight casing that are connected with each other, the fixing stability between the curved casing and the protective cover of the transmission mechanism must be taken into consideration. Therefore, it is necessary to redesign the fixing structure between the curved casing and the protective cover of the transmission mechanism.

In view of this, the present invention is to provide a fixing structure that can fix the curved casing on the protective cover of the transmission mechanism in a simply and quickly manner to avoid the problem that the curved casing may be loosened due to operating vibration.

SUMMARY OF THE INVENTION

The primary object of the present invention is to provide a fixing structure of a dental handpiece, which provides users with a simpler and easier assembly and fixing way and ensures the stability of the combination.

In order to achieve the foregoing object, the present invention provides a fixing structure of a dental handpiece, comprising a transmission assembly, a positioning sleeve, and a casing. The transmission assembly has one end connected with a handpiece head. The positioning sleeve is sleeved onto the transmission assembly. The positioning sleeve has a positioning member thereon. The casing has a front casing in the form of a curved tube and a rear casing in the form of a straight tube. The front casing is sleeved onto the positioning sleeve for covering the transmission assembly and the positioning sleeve. The rear casing is detachably connected to one end of the front casing opposite to the handpiece head. The front casing is provided with a push member. The push member is inserted toward an inside of the front casing to lean against the positioning member for the positioning member to be tightly pressed against the transmission assembly so that the front casing, the positioning sleeve and the transmission assembly are fixed and connected together.

In an embodiment of the present invention, the transmission assembly includes a protective cover and a transmission shaft inserted in the protective cover. The positioning member on the positioning sleeve is in the form of an elastic sheet. The front casing has an inner wall. The inner wall is formed with a locking hole. An opening direction of the locking hole is obliquely directed to the positioning member. The push member is locked in the locking hole. One end of the push member leans against the positioning member so that the positioning member is tightly pressed against an outer circumferential surface of the protective cover.

In an embodiment of the present invention, the transmission assembly includes a protective cover and a transmission shaft inserted in the protective cover. The positioning sleeve has a circumferential wall. The circumferential wall of the positioning sleeve is formed with a slide groove extending along an axial direction of the positioning sleeve. The positioning member is a slide block that is accommodated in the slide groove and slidable along the slide groove. The positioning member is formed with at least one perforation. A steel ball is accommodated in the perforation. The front casing has an inner wall. The inner wall is formed with a locking hole. An opening direction of the locking hole is obliquely directed to the positioning member. The push member is locked in the locking hole. One end of the push member leans against the positioning member and pushes the positioning member to slide along the slide groove, so as to drive the steel ball on the positioning member to be tightly pressed between the inner wall of the front casing and an outer circumferential surface of the protective cover.

DETAILED DESCRIPTION OF THE PREFERRED EMBODIMENTS

Figure 1:
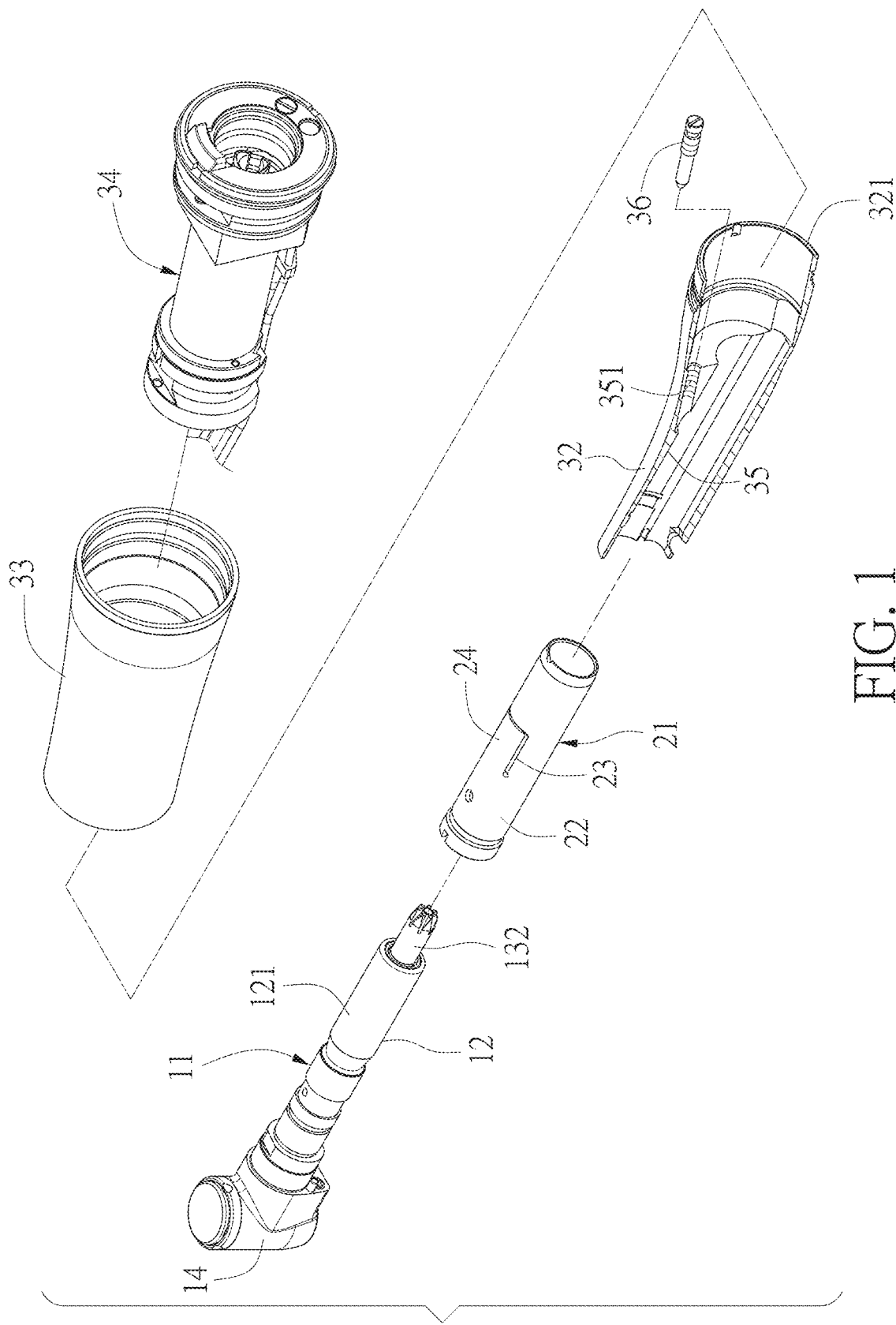
FIG. 1 is an exploded view of a first embodiment of the present invention.
Figure 2:
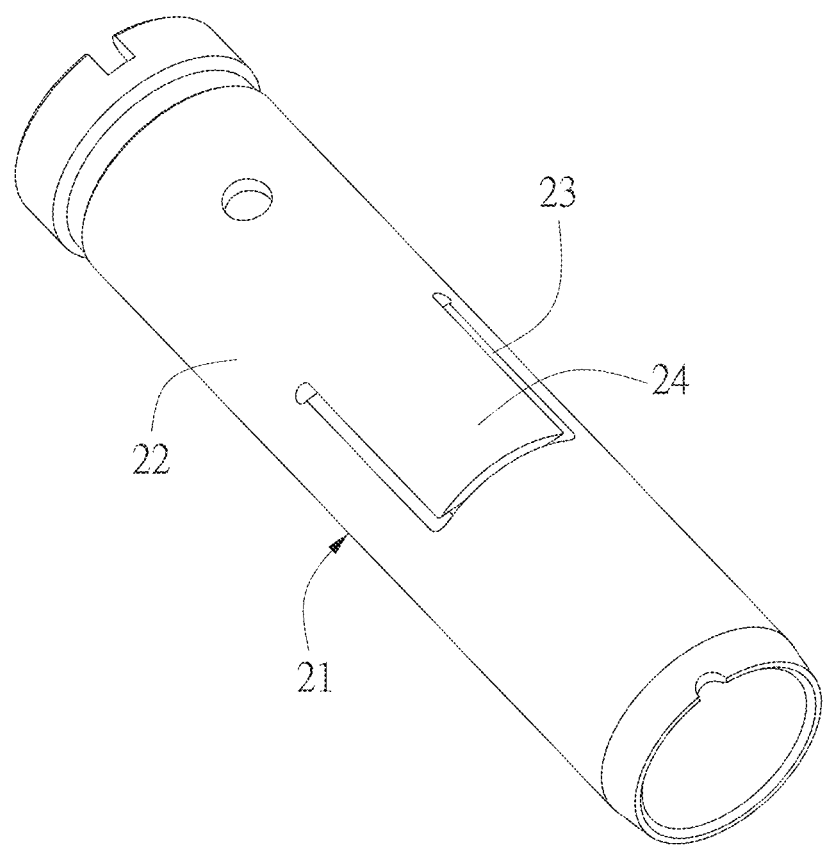
FIG. 2 is a perspective view of the positioning sleeve of the first embodiment of the present invention.
Figure 3:
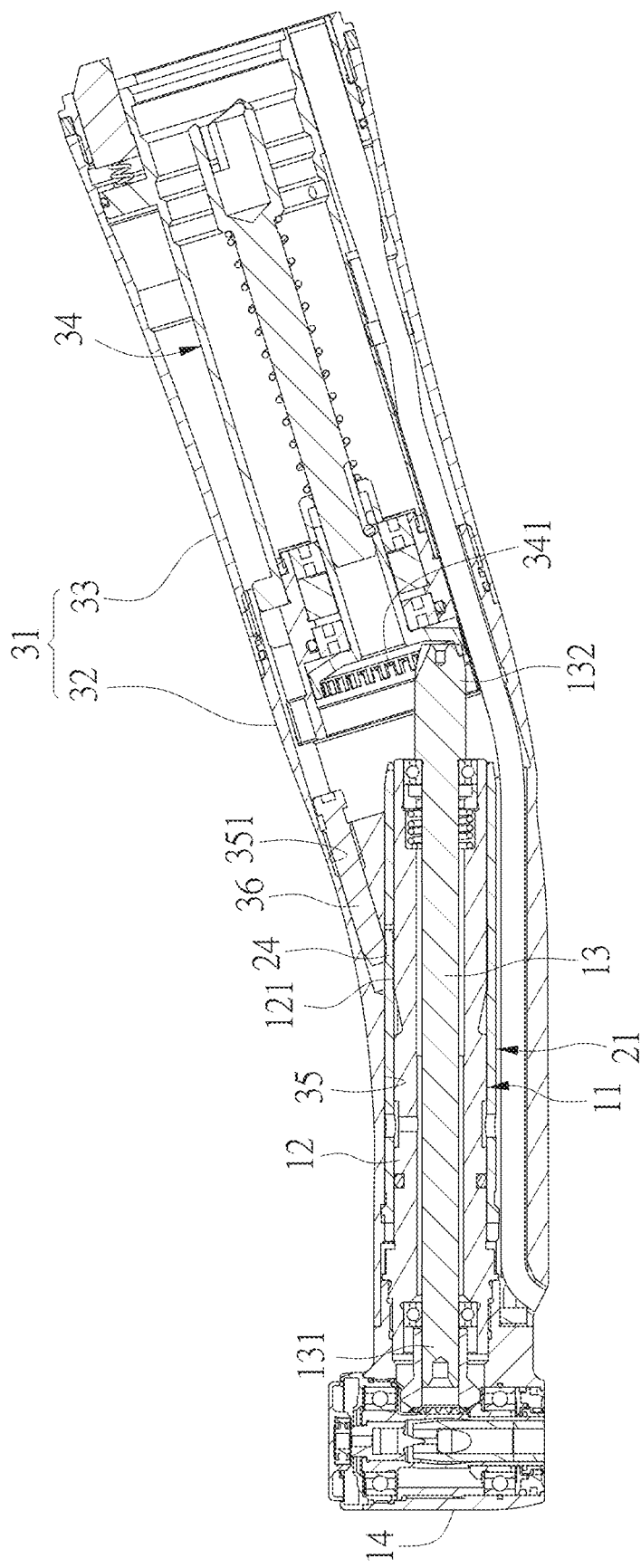
FIG. 3 is a cross-sectional view of the first embodiment of the present invention after being assembled.

Embodiments of the present invention will now be described, by way of example only, with reference to the accompanying drawings.

Referring to FIG. 1 through FIG. 4, a fixing structure of a dental handpiece according to a first embodiment of the present invention comprises a transmission assembly 11, a positioning sleeve 21, and a casing 31.

The transmission assembly 11 includes a protective cover 12 and a transmission shaft 13 inserted in the protective cover 12. One end of the protective cover 12 is provided with a handpiece head 14 for coupling a dental tool (not shown in the figures). The transmission shaft 13 has a first end 131 and a second end 132 opposite to the first end 131. The first end 131 of the transmission shaft 13 is connected to the handpiece head 14. The second end 132 of the transmission shaft 13 extends out of the other end of the protective cover 12.

The positioning sleeve 21 is a hollow cylinder and has a circumferential wall 22. The inner wall surface of the circumferential wall 22 of the positioning sleeve 21 is sleeved onto the protective cover 12 of the transmission assembly 11. The circumferential wall 22 of the positioning sleeve 21 is formed with a U-shaped groove 23, so that the positioning sleeve 21 is integrally formed with a positioning member 24 in the form of an elastic sheet in the area enclosed by the groove 23.

The casing 31 includes a front casing 32 in the form of a curved tube and a rear casing 33 in the form of a straight tube. The front casing 32 and the rear casing 33 are butted with each other. The front casing 32 is sleeved onto the positioning sleeve 21 for covering the transmission assembly 11 and the positioning sleeve 21. The front casing 32 has an open end 321 that is located opposite to the handpiece head 14. One end of the rear casing 33 is detachably connected to the open end 321 of the front casing 32. A drive assembly 34 is accommodated in the rear casing 33. A drive gear 341 of the drive assembly 34 is connected to the second end 132 of the transmission shaft 13, such that when the drive gear 341 of the drive assembly 34 is driven to rotate, the transmission shaft 13 of the transmission assembly 11 can be driven to rotate synchronously. The front casing 32 has an inner wall 35 therein. The inner wall 35 has a locking hole 351 in the form of a screw hole. The opening direction of the locking hole 351 is obliquely directed to the positioning member 24 of the positioning sleeve 21. A push member 36 in the form of a bolt is locked in the locking hole 351. By screwing the push member 36, one end of the push member 36 is inserted toward the inside of the front casing 32 to lean against the positioning member 24, such that the positioning member 24 in the form of an elastic sheet is relatively tightly pressed against an outer circumferential surface 121 of the protective cover 12 of the transmission assembly 11.

Figure 4:
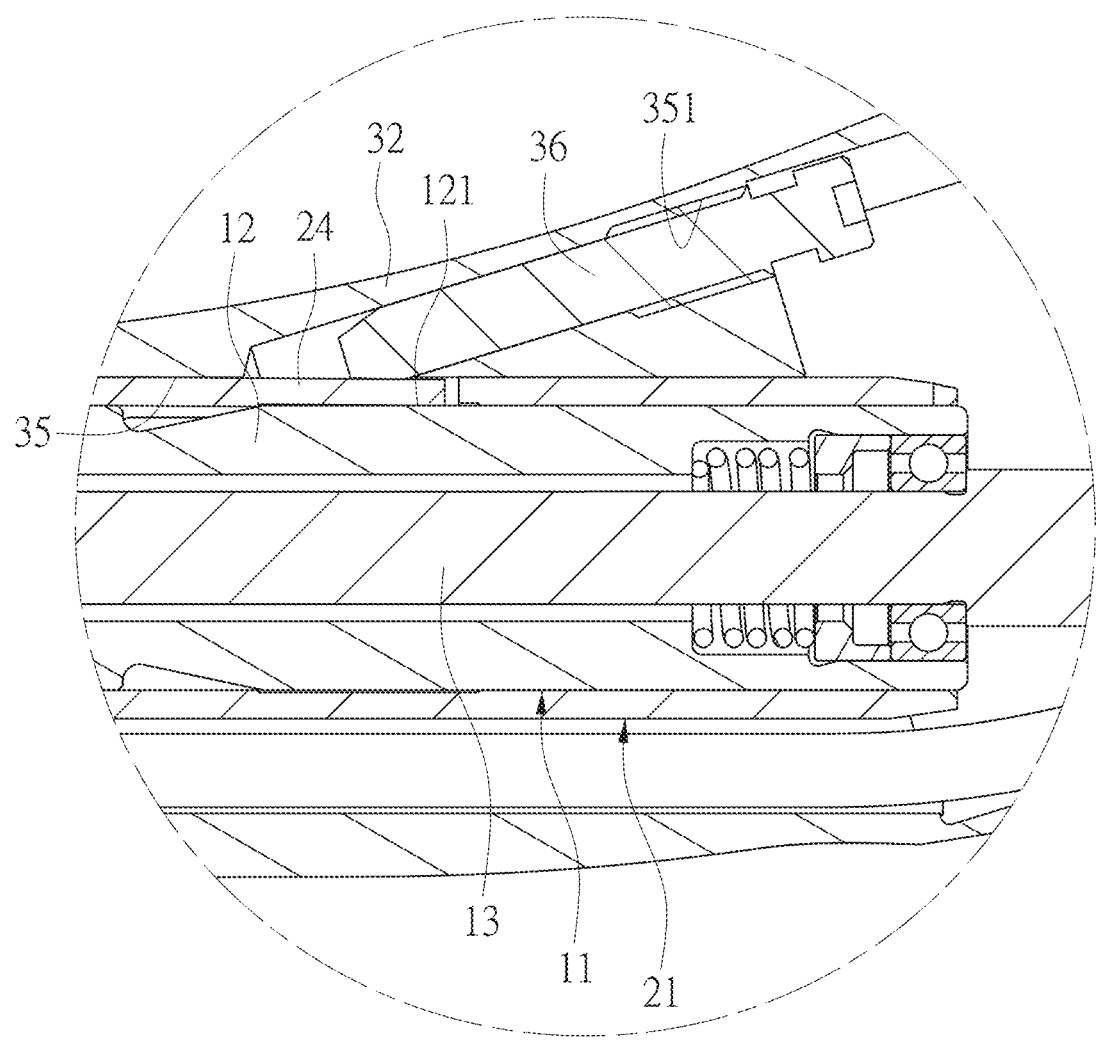
FIG. 4 is a partially enlarged schematic view of the first embodiment of the present invention in a tight state.

As shown in FIG. 4, in actual use of the first embodiment of the present invention composed of the above structure, the user only needs to screw the push member 36 in the front casing 32, and the positioning member 24 is pressed by the push member 36 to be tightly attached to the outer circumferential surface 121 of the protective cover 12. In this way, the front casing 32, the positioning sleeve 21 and the protective cover 12 of the transmission assembly 11 are fixed and connected together, thereby providing the user with a simpler and easier assembly and fixing way. Besides, it effectively avoids the problem that the front casing 32 may become loose due to operating vibration.

Figure 7:
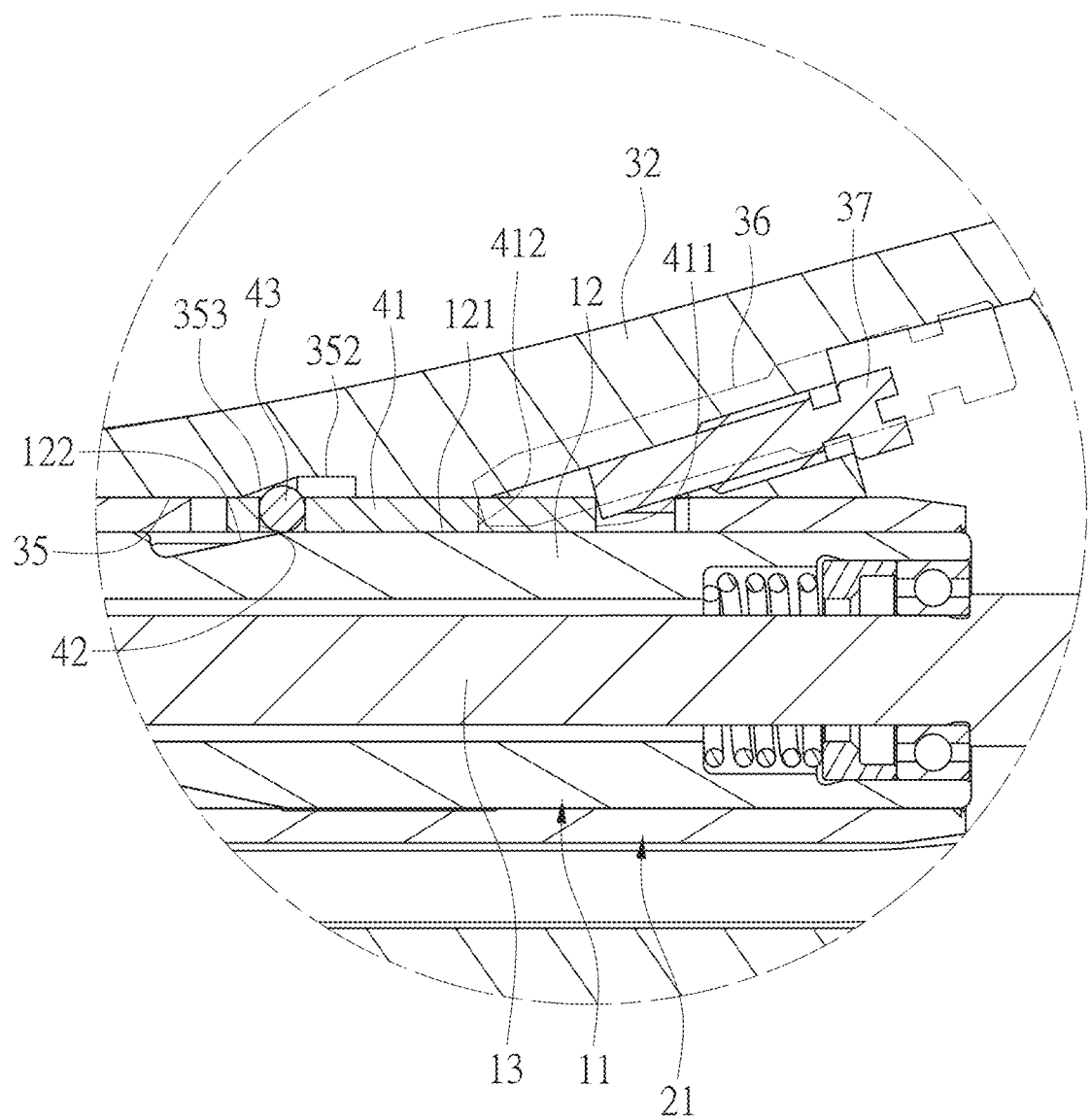
FIG. 7 is a partially enlarged schematic view of the second embodiment of the present invention before being tightened.
Figure 8:
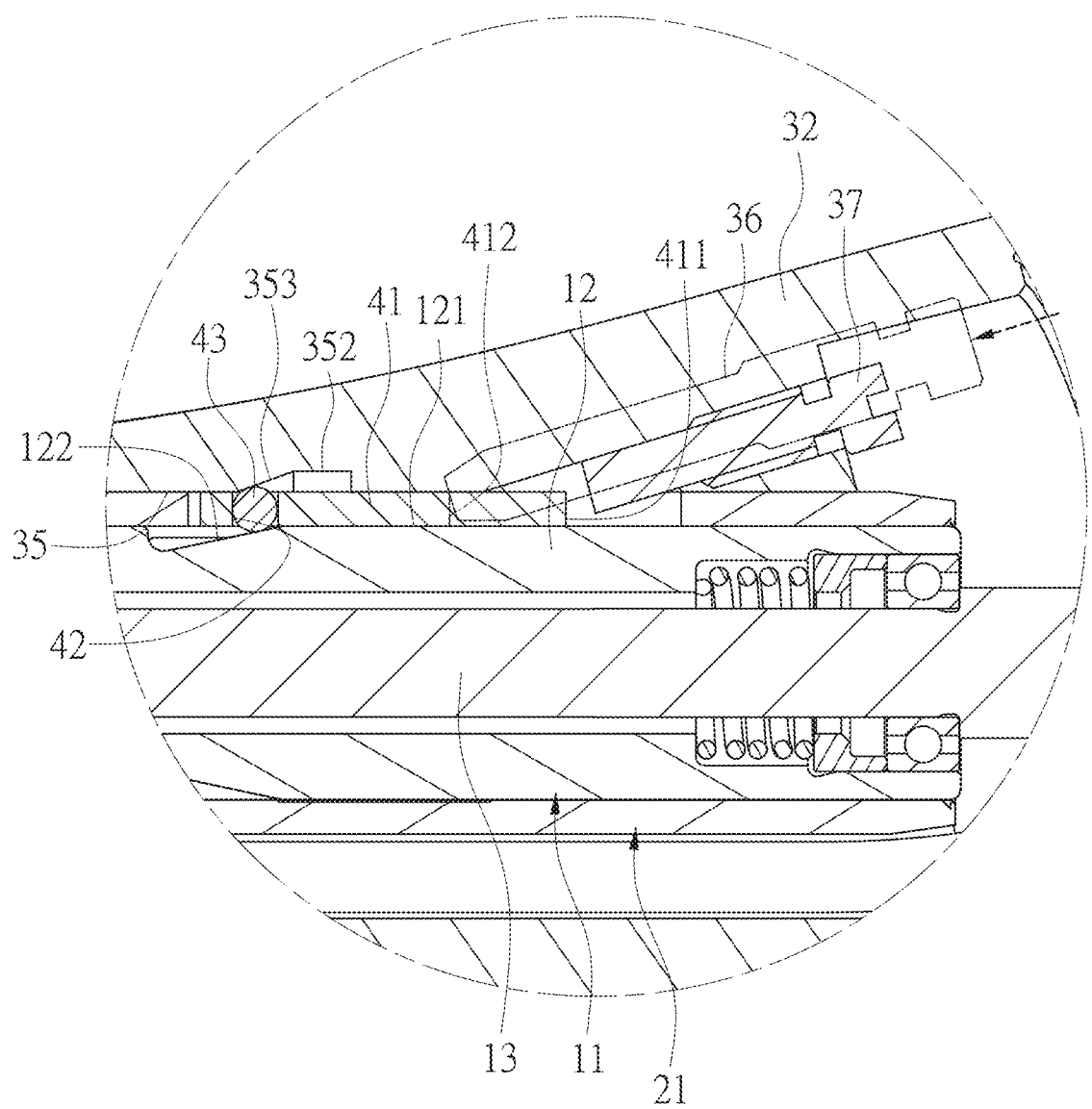
FIG. 8 is a partially enlarged schematic view of the second embodiment of the present invention after being tightened.

FIGS. 5-8 illustrate a fixing structure of a dental handpiece according to a second embodiment of the present invention. The second embodiment is different from the first embodiment in that the structure of the positioning member is slightly different. In the second embodiment, the circumferential wall 22 of the positioning sleeve 21 is formed with a slide groove 23b extending along the axial direction of the positioning sleeve 21. The positioning member 41 is a slide block that is accommodated in the slide groove 23b and slidable along the slide groove 23b. The positioning member 41 is formed with at least one perforation 42. A steel ball 43 is accommodated in the perforation 42. The positioning member 41 has a rear side 411 facing the rear casing 33. A central position of the rear side 411 is formed with an engaging recess 412 recessed in the direction of the handpiece head 14. The opening direction of the locking hole 351 is obliquely directed to the engaging recess 412 of the positioning member 41, such that one end of the push member 36 in the locking hole 351 is inserted toward the inside of the front casing 32 to lean against the engaging recess 412 of the positioning member 41. The inner wall 35 of the front casing 32 is recessed with a receiving groove 352 relative to the steel ball 43. One end of the receiving groove 352, facing the handpiece head 14, is connected to the inner wall 35 of the front casing 32 through a slope 353. As shown in FIG. 7 and FIG. 8, when the push member 36 is screwed, one end of the push member 36 pushes the positioning member 41 to slide along the slide groove 23b toward the handpiece head 14 and drives the steel ball 43 to be pressed against the slope 353 of the receiving groove 352. Through the pushing of the push member 36 and the abutting of the slope 353, the steel ball 43 on the positioning member 41 is tightly pressed between an inclined section 122 of the outer circumferential surface 121 of the protective cover 12 and the slope 353 of the receiving groove 352 of the front casing 32. Similarly, the front casing 32, the positioning sleeve 21 and the protective cover 12 of the transmission assembly 11 are fixed and connected together, thereby providing the user with a simpler and easier assembly and fixing way. Besides, it effectively avoids the problem that the front casing 32 may become loose due to operating vibration.

Figure 5:
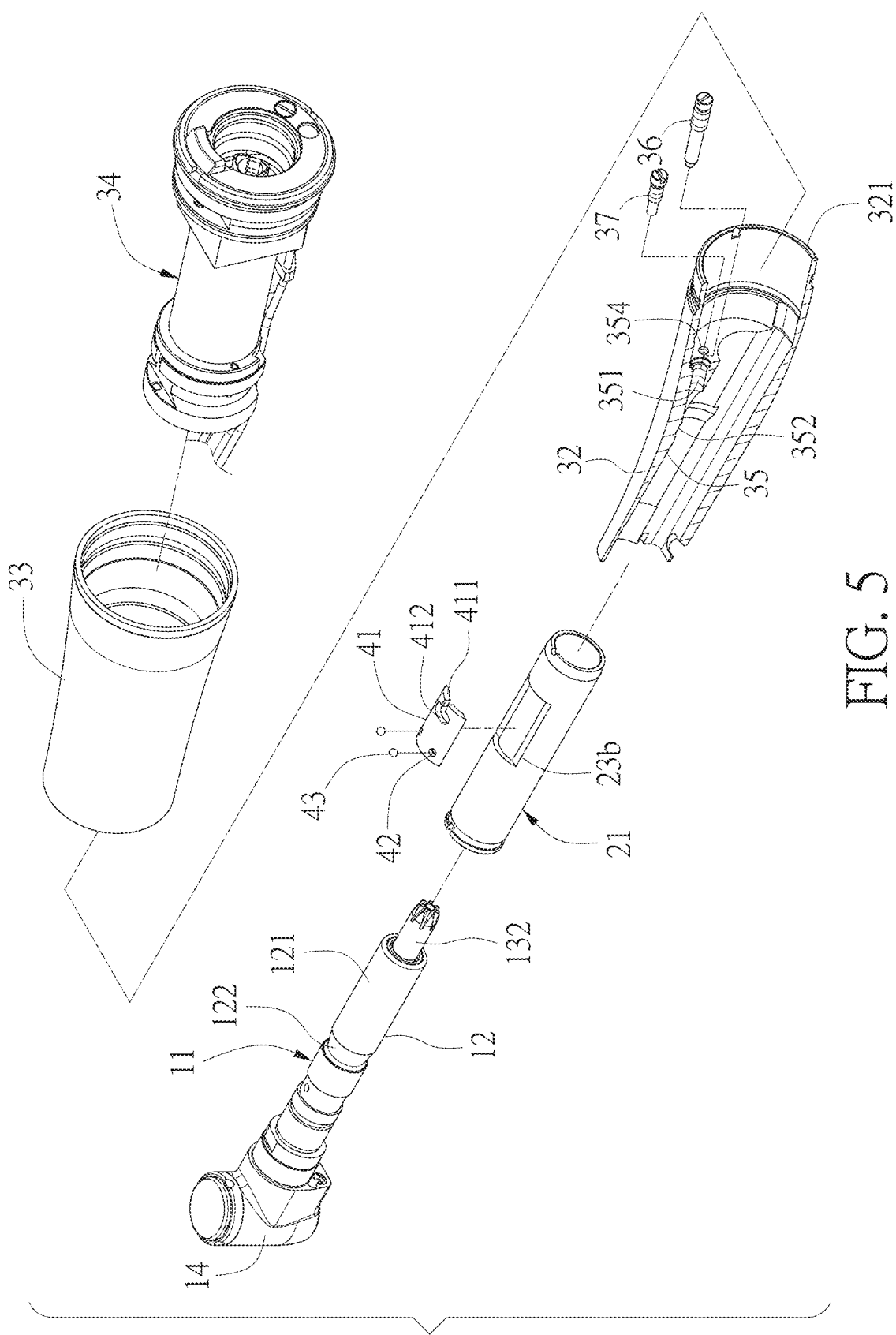
FIG. 5 is an exploded view of a second embodiment of the present invention.
Figure 6:
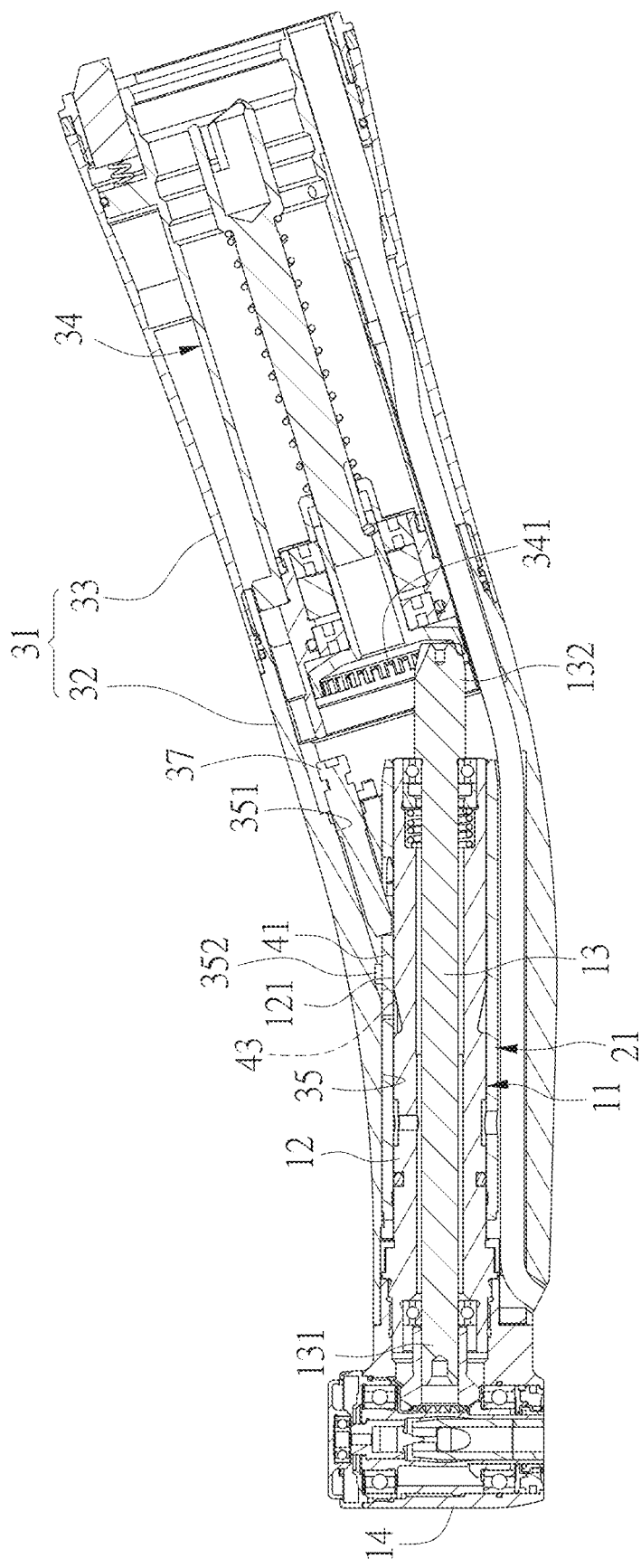
FIG. 6 is a cross-sectional view of the second embodiment of the present invention after being assembled.

In addition, in this second embodiment, as shown in FIGS. 5, 7 and 8, the inner wall 35 of the front casing 32 is formed with a limiting hole 354 beside the locking hole 351. The limiting hole 354 is in the form of a screw hole. The opening direction of the limiting hole 354 is obliquely directed to the rear side 411 of the positioning member 41. A limiting member 37 in the form of a bolt is locked in the limiting hole 354. One end of the limiting member 37 is inserted toward the inside of the front casing 32 to lean against the rear side 411 of the positioning member 41. Thereby, by adjusting the locking position of the limiting member 37, the stroke of backward movement of the positioning member 41 can be adjusted and limited.

What is claimed is:

1. A dental handpiece, comprising:
   a transmission assembly, having one end connected with a handpiece head;
   a fixing structure being a positioning sleeve, sleeved onto the transmission assembly, the positioning sleeve having a positioning member thereon;
   a casing, having a front casing in the form of a curved tube and a rear casing in the form of a straight tube, the front casing being sleeved onto the positioning sleeve for covering the transmission assembly and the positioning sleeve, the rear casing being detachably connected to one end of the front casing opposite to the handpiece head, the front casing being provided with a push member, the push member being inserted toward an inside of the front casing to lean against the positioning member for the positioning member to be tightly pressed against the transmission assembly so that the front casing, the positioning sleeve and the transmission assembly are fixed and connected together;
   wherein the transmission assembly includes a protective cover and a transmission shaft inserted in the protective cover, the positioning member on the positioning sleeve is in the form of an elastic sheet, the front casing has an inner wall, the inner wall is formed with a locking hole, an opening direction of the locking hole is obliquely directed to the positioning member, the push member is locked in the locking hole, and one end of the push member leans against the positioning member so that the positioning member is tightly pressed against an outer circumferential surface of the protective cover.

2. The dental handpiece as claimed in claim 1, wherein the positioning sleeve has a circumferential wall, an inner wall surface of the circumferential wall of the positioning sleeve is fitted onto the protective cover of the transmission assembly, and the circumferential wall of the positioning sleeve is formed with a U-shaped groove so that the positioning sleeve is integrally formed with the positioning member in the form of the elastic sheet in an area enclosed by the groove.

\* \* \* \* \*